(12) United States Patent
Levasseur et al.

(10) Patent No.: US 11,691,388 B2
(45) Date of Patent: Jul. 4, 2023

(54) METAL-ENCAPSULATED POLYMERIC ARTICLE

(71) Applicant: Raytheon Technologies Corporation, Farmington, CT (US)

(72) Inventors: Glenn Levasseur, Colchester, CT (US); Shari L. Bugaj, Haddam, CT (US); Grant O. Cook, III, Spring, TX (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 147 days.

(21) Appl. No.: 14/903,913

(22) PCT Filed: Jul. 9, 2014

(86) PCT No.: PCT/US2014/045913
§ 371 (c)(1),
(2) Date: Jan. 8, 2016

(87) PCT Pub. No.: WO2015/006421
PCT Pub. Date: Jan. 15, 2015

(65) Prior Publication Data
US 2016/0144602 A1 May 26, 2016

Related U.S. Application Data

(60) Provisional application No. 61/844,161, filed on Jul. 9, 2013.

(51) Int. Cl.
*C25D 1/10* (2006.01)
*B32B 15/08* (2006.01)
(Continued)

(52) U.S. Cl.
CPC .............. *B32B 15/08* (2013.01); *B29B 11/06* (2013.01); *B29B 11/14* (2013.01); *B29C 43/183* (2013.01);
(Continued)

(58) Field of Classification Search
CPC ............ C25D 1/10; B29C 33/52; B29C 33/54
See application file for complete search history.

(56) References Cited

U.S. PATENT DOCUMENTS 1,843,886 A * 2/1932 Semmes ............... B64C 11/205
416/2
2,315,574 A * 4/1943 Anderson ............... F16C 19/18
416/220 A
(Continued)

FOREIGN PATENT DOCUMENTS

CN 103061827 A 4/2013
DE 2142474 A1 3/1973
(Continued)

OTHER PUBLICATIONS

Seong, KR1020070104792 English translation, Oct. 29, 2007 (Year: 2007).*
(Continued)

*Primary Examiner* — Matthew J Daniels
(74) *Attorney, Agent, or Firm* — Cantor Colburn LLP

(57) ABSTRACT

An encapsulated polymeric article is disclosed. The encapsulated polymeric article may include a polymer substrate and a metallic outer shell at least partially encapsulating the polymer substrate. The encapsulated polymeric article may be fabricated by a method comprising: 1) providing a mandrel in a shape of the encapsulated polymeric article, 2) shaping the metallic outer shell on the mandrel, 3) removing the mandrel from the metallic outer shell, and 4) molding the polymeric substrate into the metallic outer shell through a
(Continued)

port formed in the metallic outer shell to provide the encapsulated polymeric article.

6 Claims, 2 Drawing Sheets

(51) Int. Cl.
  C25D 5/02   (2006.01)
  C25D 7/04   (2006.01)
  C23C 18/16  (2006.01)
  B29B 11/06  (2006.01)
  B29B 11/14  (2006.01)
  B29C 43/18  (2006.01)
  B29C 45/14  (2006.01)
  C23C 26/00  (2006.01)
  E04B 1/19   (2006.01)
  E04B 1/30   (2006.01)
  B29K 101/10 (2006.01)
  B29K 101/12 (2006.01)
  B29K 105/20 (2006.01)
  B29K 705/00 (2006.01)
  B29L 9/00  (2006.01)

(52) U.S. Cl.
  CPC .......... *B29C 45/14* (2013.01); *C23C 18/1605* (2013.01); *C23C 26/00* (2013.01); *C25D 5/022* (2013.01); *C25D 7/04* (2013.01); *E04B 1/19* (2013.01); *E04B 1/30* (2013.01); *B29K 2101/10* (2013.01); *B29K 2101/12* (2013.01); *B29K 2105/20* (2013.01); *B29K 2705/00* (2013.01); *B29L 2009/00* (2013.01); *B32B 2250/02* (2013.01); *B32B 2307/558* (2013.01); *B32B 2605/00* (2013.01); *E04B 2001/1927* (2013.01)

(56) References Cited

U.S. PATENT DOCUMENTS

| | | | |
|---|---|---|---|
| 2,401,247 A | 5/1946 | Hunter | |
| 2,592,614 A * | 4/1952 | Stoddard, Jr. | H01P 1/02 205/73 |
| 2,942,300 A | 6/1960 | Masters | |
| 2,959,229 A | 11/1960 | Meier | |
| 3,344,515 A | 10/1967 | Schuster et al. | |
| 3,464,898 A * | 9/1969 | Norris | C25D 1/00 205/166 |
| 3,513,051 A * | 5/1970 | Lichfield | B29C 63/34 156/153 |
| 3,560,349 A * | 2/1971 | Mattia | C25D 1/00 205/73 |
| 3,573,973 A | 4/1971 | Drotar et al. | |
| 3,576,662 A | 4/1971 | Diebold et al. | |
| 3,681,209 A | 8/1972 | Campbell et al. | |
| 3,687,776 A | 8/1972 | Allard et al. | |
| 3,825,998 A * | 7/1974 | Oberbeck | H01P 3/13 138/140 |
| 3,900,320 A | 8/1975 | Rolker et al. | |
| 3,953,653 A | 4/1976 | Doss | |
| 3,959,433 A * | 5/1976 | Sauers | B29C 45/0001 264/328.6 |
| 4,005,988 A * | 2/1977 | Paulonis | B23K 35/004 428/941 |
| 4,029,838 A | 6/1977 | Chamis et al. | |
| 4,070,912 A | 1/1978 | McNaughton et al. | |
| 4,078,096 A | 3/1978 | Redmond et al. | |
| 4,148,945 A | 4/1979 | Bangs et al. | |
| 4,192,764 A | 3/1980 | Madsen | |
| 4,241,129 A | 12/1980 | Marton et al. | |
| 4,248,921 A | 2/1981 | Steigerwald et al. | |
| 4,314,892 A | 2/1982 | Stevens | |
| 4,315,970 A | 2/1982 | McGee | |
| 4,326,928 A * | 4/1982 | Dugan | C25D 1/02 205/73 |
| 4,370,364 A * | 1/1983 | Boer | F16L 55/179 427/238 |
| 4,403,075 A | 9/1983 | Byrd et al. | |
| 4,417,848 A | 11/1983 | Dembeck | |
| 4,446,191 A | 5/1984 | Miyadera et al. | |
| 4,499,157 A | 2/1985 | Mulliner et al. | |
| 4,617,977 A | 10/1986 | Mills | |
| 4,647,714 A | 3/1987 | Goto | |
| 4,739,115 A | 4/1988 | Byrd et al. | |
| 4,774,126 A | 9/1988 | Dorsey et al. | |
| 4,815,940 A | 3/1989 | Leshane et al. | |
| 4,868,071 A | 9/1989 | Walsh et al. | |
| 4,888,247 A | 12/1989 | Zweben et al. | |
| 4,894,124 A | 1/1990 | Walsh et al. | |
| 4,913,062 A | 4/1990 | Burke | |
| 4,916,110 A | 4/1990 | Manniso | |
| 4,992,144 A | 2/1991 | Walsh et al. | |
| 5,064,509 A | 11/1991 | Melnyk et al. | |
| H1088 H * | 8/1992 | Marks | B29C 53/602 156/173 |
| 5,252,160 A | 10/1993 | Scanlon et al. | |
| 5,348,446 A | 9/1994 | Lee et al. | |
| 5,556,023 A | 9/1996 | Kuramoto et al. | |
| 5,564,902 A | 10/1996 | Tomita | |
| 5,630,700 A | 5/1997 | Olsen et al. | |
| 5,656,795 A | 8/1997 | Miska | |
| 5,658,506 A | 8/1997 | White et al. | |
| 5,702,584 A | 12/1997 | Goenka et al. | |
| 5,728,423 A * | 3/1998 | Rogerson | B29C 33/36 427/183 |
| 5,833,435 A | 11/1998 | Smith | |
| 5,839,882 A | 11/1998 | Finn et al. | |
| 5,854,142 A | 12/1998 | Inoguchi et al. | |
| 5,877,240 A | 3/1999 | Piret et al. | |
| 5,931,641 A | 8/1999 | Finn et al. | |
| 6,055,786 A | 5/2000 | Hubbard et al. | |
| 6,059,533 A | 5/2000 | Stoker et al. | |
| 6,087,021 A | 7/2000 | Gaynes et al. | |
| 6,092,556 A | 7/2000 | Adkins | |
| 6,129,260 A | 10/2000 | Andrus et al. | |
| 6,159,589 A | 12/2000 | Isenberg et al. | |
| 6,240,970 B1 | 6/2001 | Ostrander et al. | |
| 6,278,185 B1 | 8/2001 | Murali et al. | |
| 6,346,030 B1 * | 2/2002 | Morales | B81C 99/0095 451/28 |
| 6,356,013 B1 | 3/2002 | Pong et al. | |
| 6,358,014 B1 | 3/2002 | Chou et al. | |
| 6,426,143 B1 | 7/2002 | Voss et al. | |
| 6,458,451 B1 | 10/2002 | Stedil et al. | |
| 6,547,210 B1 | 4/2003 | Marx et al. | |
| 6,551,063 B1 | 4/2003 | Lee et al. | |
| 6,561,763 B2 | 5/2003 | Breakwell | |
| 6,626,230 B1 | 9/2003 | Woodrum et al. | |
| 6,722,086 B2 | 4/2004 | Boots | |
| 6,725,541 B1 | 4/2004 | Holme et al. | |
| 6,777,095 B2 | 8/2004 | Bunyan et al. | |
| 6,943,288 B1 | 9/2005 | Miska | |
| 6,982,116 B1 | 1/2006 | Passman et al. | |
| 7,246,773 B2 | 7/2007 | Stoner et al. | |
| 7,452,454 B2 | 11/2008 | Dolan | |
| 7,553,514 B2 | 6/2009 | Fan et al. | |
| 7,565,996 B2 | 7/2009 | Das | |
| 7,645,519 B2 | 1/2010 | Garamszegi et al. | |
| 7,678,852 B2 | 3/2010 | Kaprinidis | |
| 7,776,447 B2 | 8/2010 | Krawczyk | |
| 7,802,613 B2 | 9/2010 | Bullied et al. | |
| 7,804,228 B2 | 9/2010 | Sadaka et al. | |
| 7,830,021 B1 | 11/2010 | Wilcoxon et al. | |
| 7,837,439 B2 | 11/2010 | Bech | |
| 7,887,921 B2 | 2/2011 | Varanasi et al. | |
| 7,927,708 B2 | 4/2011 | Mizrahi | |
| 7,931,475 B2 | 4/2011 | Kim et al. | |
| 8,069,680 B2 | 12/2011 | Hyde et al. | |
| 8,088,498 B2 | 1/2012 | Smith et al. | |
| 8,211,516 B2 | 7/2012 | Bowers et al. | |
| 8,215,518 B2 | 7/2012 | Hyde et al. | |

(56) References Cited

U.S. PATENT DOCUMENTS

| | | |
|---|---|---|
| 8,215,835 B2 | 7/2012 | Hyde et al. |
| 8,231,958 B2 | 7/2012 | Hoover et al. |
| 8,247,050 B2 | 8/2012 | McCrea et al. |
| 8,251,670 B2 | 8/2012 | Anghileri |
| 8,286,654 B2 | 10/2012 | Prasad et al. |
| 8,303,247 B2 | 11/2012 | Schlichting et al. |
| 8,313,288 B2 | 11/2012 | Schlichting et al. |
| 8,322,147 B2 | 12/2012 | Hyde et al. |
| 8,366,391 B2 | 2/2013 | Tsukagoshi et al. |
| 8,377,030 B2 | 2/2013 | Hyde et al. |
| 8,394,473 B2 | 3/2013 | McCrea et al. |
| 8,394,507 B2 | 3/2013 | Tomantschger et al. |
| 8,431,222 B2 | 4/2013 | Paul |
| 8,485,387 B2 | 7/2013 | Bowers et al. |
| 8,500,410 B2 | 8/2013 | De Moura et al. |
| 8,540,842 B2 | 9/2013 | Mizrahi |
| 8,603,598 B2 | 12/2013 | Hyde et al. |
| 8,715,439 B2 | 5/2014 | Chakrabarti et al. |
| 8,764,959 B2 | 7/2014 | Smith et al. |
| 8,814,527 B2 | 8/2014 | Huth et al. |
| 9,587,497 B2 | 3/2017 | Hunziker et al. |
| 9,758,889 B2 | 9/2017 | Chun |
| 2001/0012543 A1 | 8/2001 | Watanabe et al. |
| 2001/0020744 A1 | 9/2001 | Kuramoto et al. |
| 2001/0054379 A1 | 12/2001 | Choy et al. |
| 2002/0102160 A1 | 8/2002 | Breakwell |
| 2003/0056492 A1 | 3/2003 | Henson |
| 2003/0070387 A1 | 4/2003 | Klocke et al. |
| 2003/0183416 A1 | 10/2003 | White et al. |
| 2004/0054044 A1 | 3/2004 | Bittner et al. |
| 2004/0168470 A1 | 9/2004 | Scott et al. |
| 2004/0206399 A1 | 10/2004 | Heller et al. |
| 2004/0222103 A1 | 11/2004 | Marsales et al. |
| 2005/0070651 A1 | 3/2005 | McNulty et al. |
| 2005/0081530 A1 | 4/2005 | Bagnall et al. |
| 2005/0100720 A1 | 5/2005 | Shirai et al. |
| 2005/0115839 A1 | 6/2005 | Dolan |
| 2005/0170198 A1 | 8/2005 | Aida |
| 2005/0175813 A1 | 8/2005 | Wingert et al. |
| 2005/0212185 A1 | 9/2005 | Miyazawa |
| 2005/0271859 A1 | 12/2005 | Tuss et al. |
| 2006/0018760 A1 | 1/2006 | Bruce et al. |
| 2006/0099370 A1 | 5/2006 | Glass |
| 2006/0108533 A1 | 5/2006 | McEvoy et al. |
| 2006/0180348 A1 | 8/2006 | Cloutier et al. |
| 2006/0188730 A1 | 8/2006 | Varanasi et al. |
| 2006/0222846 A1 | 10/2006 | Ackerman et al. |
| 2006/0228546 A1 | 10/2006 | Aversenti |
| 2006/0235542 A1 | 10/2006 | Hodorek et al. |
| 2007/0011693 A1 | 1/2007 | Creasy, Jr. |
| 2007/0044765 A1 | 3/2007 | Lincourt |
| 2007/0048537 A1 | 3/2007 | Knoedler et al. |
| 2007/0081901 A1 | 4/2007 | Wagner et al. |
| 2007/0145584 A1 | 6/2007 | Kataoka et al. |
| 2007/0172643 A1 | 7/2007 | Krawczyk |
| 2007/0184288 A1 | 8/2007 | Garamszegi et al. |
| 2007/0190352 A1 | 8/2007 | Bayer et al. |
| 2007/0251389 A1 | 11/2007 | Katsir et al. |
| 2008/0044671 A1 | 2/2008 | Lee et al. |
| 2008/0050600 A1 | 2/2008 | Fan et al. |
| 2008/0178995 A1 | 7/2008 | Fernandes |
| 2008/0277979 A1 | 11/2008 | Segato |
| 2009/0008431 A1 | 1/2009 | Zonvide et al. |
| 2009/0068425 A1 | 3/2009 | Suzuki et al. |
| 2009/0082494 A1 | 3/2009 | Kaprinidis |
| 2009/0087640 A1 | 4/2009 | Li et al. |
| 2009/0092842 A1 | 4/2009 | Hoover et al. |
| 2009/0098373 A1 | 4/2009 | Dolan |
| 2009/0142193 A1 | 6/2009 | Bech |
| 2009/0145163 A1 | 6/2009 | Hyde et al. |
| 2009/0145164 A1 | 6/2009 | Hyde et al. |
| 2009/0145793 A1 | 6/2009 | Hyde et al. |
| 2009/0145910 A1 | 6/2009 | Hyde et al. |
| 2009/0145911 A1 | 6/2009 | Hyde et al. |
| 2009/0145912 A1 | 6/2009 | Hyde et al. |
| 2009/0151852 A1 | 6/2009 | Roebroeks |
| 2009/0156939 A1 | 6/2009 | Sadaka et al. |
| 2009/0169368 A1 | 7/2009 | Schlichting et al. |
| 2009/0191345 A1 | 7/2009 | Griffin |
| 2009/0226746 A1 | 9/2009 | Chakrabarti et al. |
| 2009/0283534 A1 | 11/2009 | Bowers et al. |
| 2009/0286022 A1 | 11/2009 | Bowers et al. |
| 2010/0014964 A1 | 1/2010 | Smith et al. |
| 2010/0018981 A1 | 1/2010 | Hyde et al. |
| 2010/0039779 A1 | 2/2010 | Mitchell et al. |
| 2010/0040902 A1 | 2/2010 | Mizrahi |
| 2010/0068552 A1 | 3/2010 | Goerlich et al. |
| 2010/0084037 A1 | 4/2010 | Ericsson et al. |
| 2010/0146986 A1 | 6/2010 | Hussain |
| 2010/0159260 A1 | 6/2010 | Elia et al. |
| 2010/0170802 A1 | 7/2010 | Kawashita et al. |
| 2010/0213200 A1 | 8/2010 | Deane et al. |
| 2010/0226783 A1 | 9/2010 | Lipkin et al. |
| 2010/0232974 A1 | 9/2010 | De Moura et al. |
| 2010/0258344 A1 | 10/2010 | Creasy, Jr. |
| 2010/0266391 A1 | 10/2010 | Schlichting et al. |
| 2010/0288433 A1 | 11/2010 | Montesano et al. |
| 2010/0304063 A1* | 12/2010 | McCrea ............... C08J 7/04 428/35.8 |
| 2010/0304065 A1 | 12/2010 | Tomantschger et al. |
| 2010/0304171 A1 | 12/2010 | Tomantschger et al. |
| 2010/0325855 A1 | 12/2010 | Sadaka et al. |
| 2011/0008164 A1 | 1/2011 | Presz, Jr. |
| 2011/0012478 A1 | 1/2011 | Najaf et al. |
| 2011/0033308 A1 | 2/2011 | Huth et al. |
| 2011/0091740 A1 | 4/2011 | Sugahara et al. |
| 2011/0097589 A1 | 4/2011 | Meschter et al. |
| 2011/0127273 A1 | 6/2011 | Deane et al. |
| 2011/0142597 A1 | 6/2011 | Tsukagoshi et al. |
| 2011/0155745 A1 | 6/2011 | Chou et al. |
| 2011/0162788 A1 | 7/2011 | Mizrahi |
| 2011/0167785 A1 | 7/2011 | Moore et al. |
| 2011/0168843 A1 | 7/2011 | Calder |
| 2011/0200816 A1 | 8/2011 | Mizrahi et al. |
| 2011/0211967 A1 | 9/2011 | Deal et al. |
| 2011/0215585 A1 | 9/2011 | Caires |
| 2011/0283873 A1 | 11/2011 | Wadley et al. |
| 2011/0286854 A1 | 11/2011 | Watson |
| 2011/0287223 A1 | 11/2011 | Victor et al. |
| 2011/0289936 A1 | 12/2011 | Suciu et al. |
| 2011/0294594 A1 | 12/2011 | Palumbo et al. |
| 2011/0308201 A1 | 12/2011 | Hyde et al. |
| 2012/0000918 A1 | 1/2012 | Deane et al. |
| 2012/0061243 A1 | 3/2012 | Smith et al. |
| 2012/0076647 A1 | 3/2012 | Robertson, Jr. et al. |
| 2012/0082541 A1 | 4/2012 | Macchia et al. |
| 2012/0082553 A1 | 4/2012 | Eleftheriou et al. |
| 2012/0082559 A1 | 4/2012 | Guglielmin et al. |
| 2012/0082783 A1 | 4/2012 | Barnett et al. |
| 2012/0085070 A1 | 4/2012 | Chou et al. |
| 2012/0094777 A1 | 4/2012 | Hechler-Stabbert et al. |
| 2012/0148388 A1 | 6/2012 | Bottome |
| 2012/0152893 A1 | 6/2012 | Parkos et al. |
| 2012/0174508 A1 | 7/2012 | Brooks et al. |
| 2012/0193241 A1 | 8/2012 | Ke et al. |
| 2012/0275968 A1 | 11/2012 | Puntambekar |
| 2012/0285648 A1 | 11/2012 | Mueller et al. |
| 2012/0321443 A1 | 12/2012 | Ravey et al. |
| 2012/0321906 A1 | 12/2012 | McCrea et al. |
| 2013/0034725 A1 | 2/2013 | Paul |
| 2013/0089431 A1 | 4/2013 | Stevenson et al. |
| 2013/0105031 A1 | 5/2013 | Dambrine et al. |
| 2013/0134436 A1 | 5/2013 | Pham et al. |
| 2013/0143058 A1 | 6/2013 | McCrea et al. |
| 2013/0143060 A1 | 6/2013 | Jacobsen et al. |
| 2013/0146594 A1 | 6/2013 | Hirano et al. |
| 2013/0205800 A1 | 8/2013 | Ivakitch et al. |
| 2014/0002952 A1 | 1/2014 | McConnell et al. |
| 2014/0053970 A1 | 2/2014 | Hyde et al. |
| 2014/0057073 A1 | 2/2014 | Hyde et al. |
| 2014/0102626 A1 | 4/2014 | Clayton et al. |
| 2014/0120320 A1 | 5/2014 | Kanai et al. |
| 2014/0162086 A1 | 6/2014 | Mizrahi |
| 2014/0193658 A1 | 7/2014 | Ross et al. |

(56) References Cited

U.S. PATENT DOCUMENTS

| | | |
|---|---|---|
| 2014/0203069 A1 | 7/2014 | Wang et al. |
| 2015/0050422 A1 | 2/2015 | Tews et al. |
| 2015/0298791 A1 | 10/2015 | Nordin et al. |
| 2016/0145447 A1 | 5/2016 | Miarecki et al. |
| 2016/0145850 A1 | 5/2016 | Cook et al. |
| 2016/0146022 A1 | 5/2016 | Twelves et al. |
| 2016/0152005 A1 | 6/2016 | Roach et al. |
| 2016/0153287 A1 | 6/2016 | Roach et al. |
| 2016/0159488 A1 | 6/2016 | Roach et al. |
| 2016/0160353 A1 | 6/2016 | Miarecki et al. |
| 2016/0160681 A1 | 6/2016 | Roach et al. |
| 2016/0160863 A1 | 6/2016 | Roach et al. |
| 2016/0160869 A1 | 6/2016 | Roach et al. |
| 2016/0167791 A1 | 6/2016 | Roach et al. |
| 2016/0169012 A1 | 6/2016 | Dacunha et al. |
| 2016/0212857 A1 | 7/2016 | Miyoshi et al. |
| 2016/0251760 A1 | 9/2016 | Levasseur et al. |
| 2016/0368238 A1 | 12/2016 | Bogue et al. |
| 2016/0369419 A1 | 12/2016 | Miarecki et al. |
| 2016/0369635 A1 | 12/2016 | Xu et al. |
| 2016/0376709 A1 | 12/2016 | Galos et al. |
| 2017/0025223 A1 | 1/2017 | Bultitude et al. |
| 2017/0358397 A1 | 12/2017 | McConnell et al. |
| 2019/0164865 A1 | 5/2019 | Elger et al. |

FOREIGN PATENT DOCUMENTS

| | | | |
|---|---|---|---|
| EP | 043174 A2 | | 11/1996 |
| EP | 2281746 A2 | | 2/2011 |
| EP | 2469025 A2 | | 6/2012 |
| EP | 2610460 A2 | | 7/2013 |
| GB | 2136313 A | | 9/1984 |
| JP | 05157190 A | | 6/1993 |
| JP | 06170514 A | | 6/1994 |
| JP | 06315919 A | | 11/1994 |
| JP | 2002292613 A | | 10/2002 |
| JP | 2005171916 A | | 6/2005 |
| JP | 2008062511 A | | 3/2008 |
| JP | 2010001511 A | | 1/2010 |
| JP | 2011032987 A | | 2/2011 |
| JP | 2013504007 A | | 2/2013 |
| KR | 20070104792 | * | 10/2007 ............. C25D 1/003 |
| KR | 20070104792 A | * | 10/2007 |
| KR | 1020070104792 A | | 10/2007 |
| WO | 0061831 A1 | | 10/2000 |
| WO | 0146324 A2 | | 6/2001 |
| WO | 2011087098 A1 | | 7/2011 |
| WO | 2012058470 A1 | | 5/2012 |
| WO | 2012110383 A2 | | 8/2012 |

OTHER PUBLICATIONS

English Abstract for Japanese application No. JP06170514A; Filing date: Jun. 21, 1994.
English Abstract for Japanese Application No. JP2010001511; Filing date: Jan. 7, 2010.
English Abstract for Japanese Publication No. 06-315919; Date of Publication: Nov. 15, 1994.
International Search Report for International application No. PCT/US2014/045907; International filing date: Jul. 9, 2014; dated Oct. 24, 2014.
International Search Report for International Application No. PCT/US2014/045911; International filing date: Jul. 9, 2014; dated Oct. 30, 2014.
International Search Report for International Application No. PCT/US2014/045913; International filing date: Jul. 9, 2014; dated Oct. 20, 2014.
International Search Report for International application No. PCT/US2014/045921; International filing date: Jul. 9, 2014; dated Oct. 30, 2014.
International Search Report for International Application No. PCT/US2014/045932; International Filing Date: Jul. 9, 2014; dated Oct. 27, 2014.
International Search Report for International Application No. PCT/US2014/046012; International filing date: Jul. 9, 2014; dated Oct. 28, 2014.
International Search Report for International application No. PCT/US2014/046013; International filing date: Jul. 9, 2014; dated Oct. 27, 2014.
International Search Report for International application No. PCT/US2014/046017; International filing date: Jul. 9, 2014; dated Oct. 29, 2014.
International Search Report for International Application No. PCT/US2014/045879; International Filing Date: Jul. 9, 2014; dated Oct. 17, 2014.
PCT Written Opinion for International Application No. PCT/US2014/045913; International filing date: Jul. 9, 2014; dated Oct. 20, 2014.
PCT Written Opinion for International Application No. PCT/US2014/045932; International Filing Date: Jul. 9, 2014; dated Oct. 27, 2014.
PCT International Search Report for International application No. PCT/US2014/045929; International filing date: Jul. 9, 2014; dated Apr. 17, 2015.
PCT Written Opinion for International application No. PCT/US2014/045929; International filing date: Jul. 9, 2014; dated Apr. 17, 2015.
PCT Written Opinion for International application No. PCT/US2014/045907; International filing date: Jul. 9, 2014; dated Oct. 24, 2014.
PCT Written Opinion for International application No. PCT/US2014/046013; International filing date: Jul. 9, 2014; dated Oct. 27, 2014.
PCT Written Opinion for International Application No. PCT/US2014/046012; International filing date: Jul. 9, 2014; dated Oct. 28, 2014.
PCT Written Opinion for International application No. PCT/US2014/046017; International filing date: Jul. 9, 2014; dated Oct. 29, 2014.
PCT Written Opinion for International Application No. PCT/US2014/045911; International filing date: Jul. 9, 2014; dated Oct. 30, 2014.
PCT Written Opinion for International Application No. PCT/US2014/045879; International Filing Date: Jul. 9, 2014; dated Oct. 17, 2014.
PCT Written Opinion for International application No. PCT/US2014/045921; International filing date: Jul. 9, 2014; dated Oct. 30, 2014.
ASM, "Advances in Soldering Technology" (2004), 10 pages.
Cook, III and Soreensen, "Overview of transient liquid phase and partial transient lqiud phase bonding", J. Mater Sci (2011) 46:5305-5323 DOI 10.1007/s10853-011-5561-1, 19 pages.
European Search Report for European Application No. 14832491.6; Application Filing Date Feb. 8, 2016; dated Feb. 18, 2020; 6 pages.
European Office Action for European Application No. 14822183.1; Application Filing Date: Feb. 8, 2016; dated Jul. 7, 2020, 6 pages.

* cited by examiner

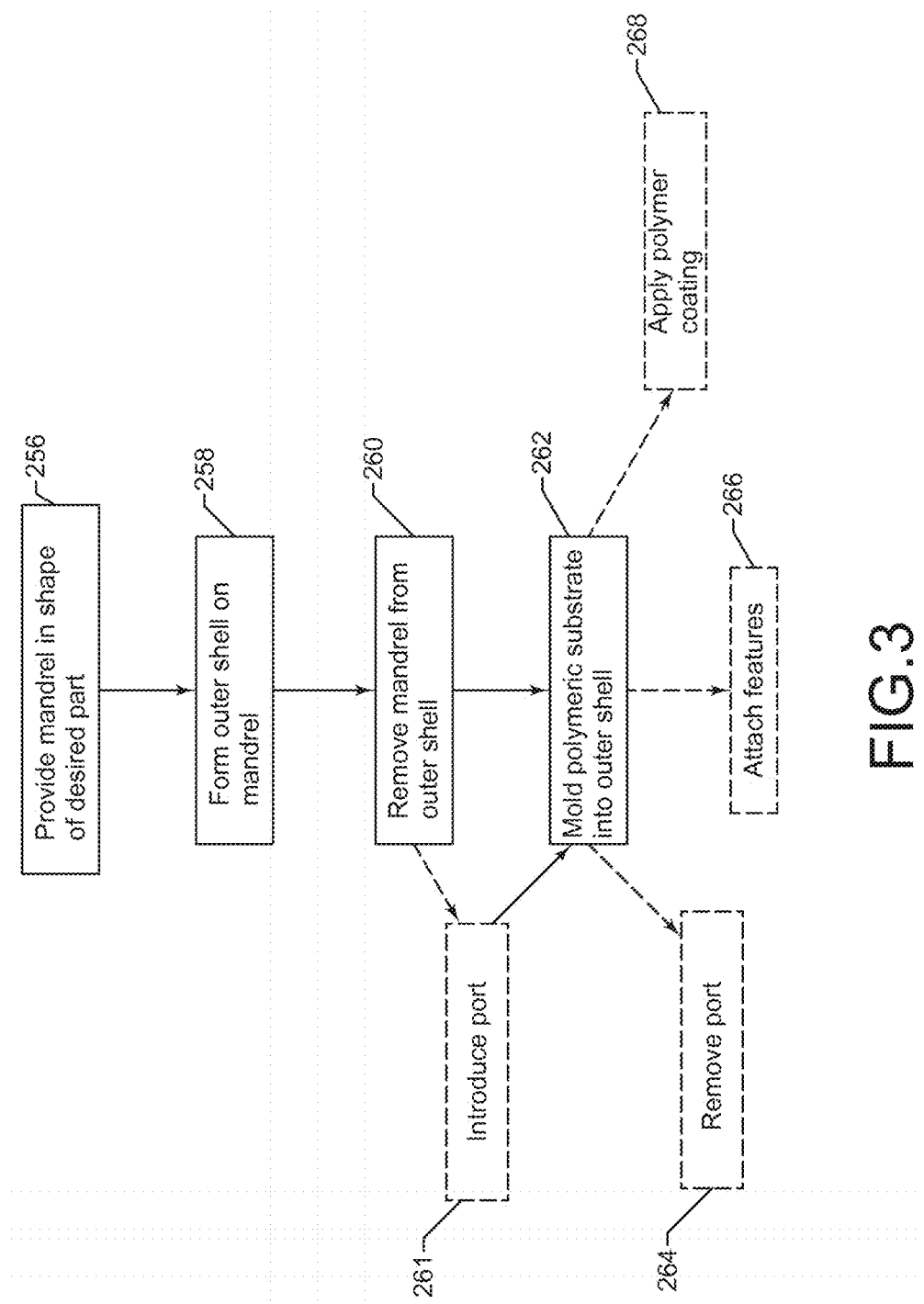

METAL-ENCAPSULATED POLYMERIC ARTICLE

CROSS-REFERENCE TO RELATED APPLICATIONS

This application claims priority under 35 U.S.C. § 119(e) to U.S. Provisional Patent Application Ser. No. 61/844,161 filed on Jul. 9, 2013.

FIELD OF THE DISCLOSURE

The present disclosure generally relates to polymeric components. More specifically, this disclosure relates polymeric components at least partially encapsulated in a metallic outer shell.

BACKGROUND

Many engineers continue to seek strategies to fabricate high-strength and lightweight components in complex geometries for various industrial applications. Lightweight components may be desirable, for example, in some applications (e.g., automotive and aerospace applications) to provide increases in fuel efficiency. In addition, higher-strength components may exhibit enhanced performance characteristics such as improved environmental durability, erosion resistance, and impact resistance. Polymeric materials may be attractive materials for forming components with complex geometrical features, as they are lightweight and may be molded into a range of complex shapes. However, many polymeric materials may be limited to relatively few structurally loaded applications due to their low strengths relative to metallic materials. In addition, certain complex geometries may be costly to access by conventional polymer molding techniques such as injection molding.

Clearly, there is a need for enhancements to provide high-strength and lightweight parts in a range of complex geometries.

SUMMARY OF THE DISCLOSURE

In accordance with one aspect of the present disclosure, an encapsulated polymeric article is disclosed. The encapsulated polymeric article may comprise a polymer substrate, and an outer shell at least partially encapsulating the polymer substrate. The polymer substrate and the outer shell may be in mechanical contact without being bonded to each other.

In another refinement, the outer shell may be formed from a metallic material.

In another refinement, the outer shell may fully encapsulate the polymer substrate.

In another refinement, the metallic material may be selected from the group consisting of nickel, cobalt, copper, iron, gold, silver, palladium, rhodium, chromium, zinc, tin, cadmium, and an alloy of any of the foregoing elements comprising at least 50 wt. % of the alloy, and combinations thereof.

In another refinement, the polymer substrate may be formed from a thermoplastic material.

In another refinement, the thermoplastic material may be selected from the group consisting of polyetherimide, thermoplastic polyimide, polyether ether ketone, polyether ketone ketone, polysulfone, polyamide, polyphenylene sulfide, polyesters, polyimide, and combinations thereof.

In another refinement, the polymer substrate may be formed from a thermoset material.

In another refinement, the thermoset material may be selected from the group consisting of a condensation polyimide, an addition polyimide, an epoxy cured with an aliphatic amine, an aromatic amine, and/or an anhydride, a cyanate ester, a phenolic compound, a polyester, polybenzoxazine, a polyurethane, a polyacrylate, a polymethacrylate, a thermoset silicone, and combinations thereof.

In another refinement, the polymer substrate may be reinforced with a reinforcement material selected from glass and carbon.

In accordance with another aspect of the present disclosure, an encapsulated polymeric article is disclosed. The encapsulated polymeric article may include a polymer substrate and a metallic outer shell at least partially encapsulating the polymer substrate. The encapsulated polymeric article may be fabricated by a method comprising: 1) providing a mandrel in a shape of the encapsulated polymeric article, 2) shaping the metallic outer shell on the mandrel, 3) removing the mandrel from the metallic outer shell, and 4) molding the polymeric substrate into the metallic outer shell through a port formed in the metallic outer shell to provide the encapsulated polymeric article.

In another refinement, shaping the metallic outer shell on the mandrel may comprise shaping the metallic outer shell on the mandrel by a method selected from the group consisting of electroforming, cold spraying, and plasma vapor deposition.

In another refinement, molding the polymeric substrate into the metallic outer shell may comprise injecting a polymeric material into the metallic outer shell.

In another refinement, molding the polymeric substrate into the metallic outer shell may comprise molding the polymeric substrate by compression molding.

In another refinement, the method may further comprise introducing the port into the metallic outer shell prior to molding the polymeric substrate into the metallic outer shell.

In another refinement, the method may further comprise attaching one or more additional features to the encapsulated polymeric article.

In another refinement, the method may further comprise removing the port from the metallic outer shell after molding the polymeric substrate into the metallic outer shell.

In accordance with another aspect of the present disclosure, a method for fabricating an encapsulated polymeric article is disclosed. The method may comprise: 1) providing a mandrel in a shape of the encapsulated polymeric article, 2) shaping an outer shell on the mandrel, 3) removing the mandrel from the outer shell, and 4) molding a polymeric substrate into the outer shell through a port formed in the outer shell to provide the encapsulated polymeric article.

In another refinement, shaping the outer shell on the mandrel may comprise shaping the outer shell on the mandrel by a method selected from the group consisting of electroforming, cold spraying, and plasma vapor deposition.

In another refinement, molding the polymeric substrate into the outer shell may comprise injecting a polymeric material into the outer shell.

In another refinement, molding the polymeric substrate into the outer shell may comprise molding the polymeric substrate by compression molding.

These and other aspects and features of the present disclosure will be more readily understood when read in conjunction with the accompanying drawings.

BRIEF DESCRIPTION OF THE DRAWINGS

FIG. 3 is a flowchart illustrating a method for the fabrication of the metal-encapsulated polymeric article, in accordance with a method of the present disclosure.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use with certain applications. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 2:
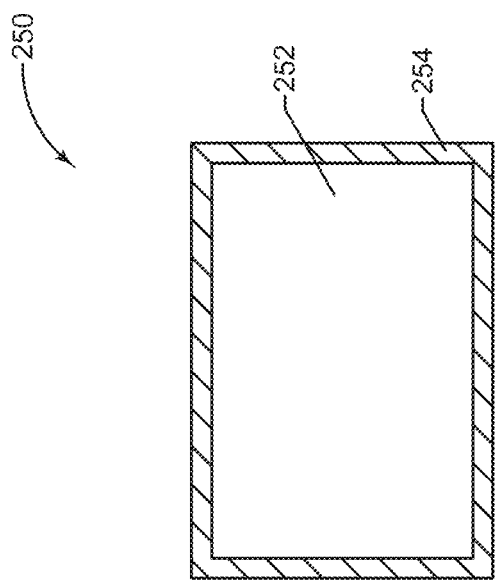
FIG. 2 is a cross-sectional view of the metal-encapsulated polymeric article of FIG. 1 taken along the line 2-2 of FIG. 1, constructed in accordance with the present disclosure.
Figure 1:
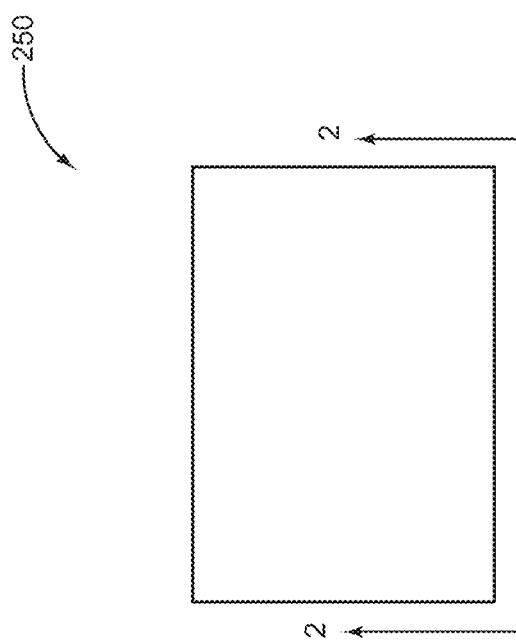
FIG. 1 is a front view of a metal-encapsulated polymeric article, constructed in accordance with the present disclosure.

Referring now to FIGS. 1 and 2, an encapsulated polymeric article 250 is shown. The encapsulated polymeric article 250 may consist of a polymeric substrate 252 encapsulated in one or more outer shells 254, as best shown in FIG. 2. Depending on the application, the polymeric substrate 252 may be fully encapsulated or it may be partially encapsulated in the outer shell 254. The outer shell 254 may be formed from a metallic material and may substantially increase the strength of the article 250 over all polymeric materials of similar size and dimensions. Accordingly, the article 250 may exhibit enhanced performance characteristics over similarly-dimensioned completely polymeric parts with respect to properties such as, but not limited to, environmental durability, erosion resistance, impact resistance, and resistance to foreign-objection damage. In addition, the article 250 may exhibit a range of geometries, including complex geometries. More specifically, it may have any shape suitable for its intended use, which may deviate substantially from the exemplary box-like structure shown in FIGS. 1 and 2.

The polymeric substrate 252 may be in intimate contact with the outer shell 254 and there may be a mechanical interaction between the polymeric substrate 252 and the outer shell 254. However, the polymer substrate 252 may not be directly bonded to the outer shell 254. If the outer shell 254 is formed from metallic materials, it may be formed from a range of metallic materials, such as, but not limited to, nickel, cobalt, copper, iron, gold, silver, palladium, rhodium, chromium, zinc, tin, cadmium, and alloys with any of the foregoing elements comprising at least 50 wt. % of the alloy, and combinations thereof. The polymeric substrate 252 may be formed from a thermoplastic material or a thermoset material, and it may be optionally structurally reinforced with reinforcement materials, such as, but not limited to, carbon or glass. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyesters, polyimide, combinations thereof, or any of the foregoing with reinforcement (e.g., carbon or glass). Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), combinations thereof, or any of the foregoing with fiber reinforcement.

A method for fabricating the encapsulated polymeric article 250 is illustrated in FIG. 3. Beginning with a first block 256, a mandrel in the shape of the desired article may be provided. The mandrel may be designed to be removable from the outer shell 254 or it may be a sacrificial mandrel. It may be formed in the desired shape by a conventional forming process (e.g., additive manufacturing, etc.) from a range of materials such as, but not limited to, metallic materials including pure metals and alloys, polymeric materials, glass, or wood. According to a next block 258, the outer shell 254 may be formed on the mandrel from selected metallic materials. The outer shell 254 may be shaped on the mandrel using a range of processes apparent to those skilled in the art such as, but not limited to, electroforming, cold spraying, plasma vapor deposition, or other spray deposition processes.

Subsequent to the block 258, the mandrel may be removed from the outer shell 254 according to a block 260, leaving the outer shell 254 with one or more open (or hollow) internal cavities for receiving polymeric materials. A port (or opening) for receiving the polymeric materials may be directly formed in the body of the outer shell 254 during its formation (block 258), but if not, a port may be later introduced into the body of the outer shell by an optional block 261, as shown. This port may have features such as a flange or a boss to facilitate attachment of a polymer molding tool in the next step (see below).

Following the block 260 (or the block 261), the polymeric substrate 252 may be molded in the outer shell 254 by injecting selected polymeric materials (selected from the thermoplastic or thermoset materials described above) into the outer shell 254 through the port, according to a block 262. Alternatively, the polymeric substrate 252 may be molded into the outer shell 254 by compression molding or another suitable process selected by a skilled artisan.

The block 262 may furnish the desired encapsulated polymeric article 250, although additional optional processing of the article may also follow. For example, the port on the outer shell 254 may be removed by machining or another process by an optional block 264, as shown. Alternatively, the port may be designed to be an integral part of the article 250 and may be used, for example, to subsequently attach the article 250 to another component. In addition, additional features (e.g., bosses or inserts) may be attached to the encapsulated polymeric article 250 according to an optional block 266. Such features may be attached to selected surfaces of the article using a range of methods apparent to those skilled in the art such as, but not limited to, adhesive bonding, riveting, brazing, or transient liquid phase (TLP) bonding. It is noted that the optional block 266 may also be performed prior to the block 262, if desired. As another optional processing step, a polymer coating may be applied over the surfaces of the article 250 according to an optional block 268, as shown. The polymer coating may be applied by conventional processes such as, but not limited to, spray coating or dip coating, and it may be applied over all of the outer surfaces of the article or on selected surfaces. The optional polymer coating may produce a lightweight, strong, and polymeric-appearing (non-conductive) article.

INDUSTRIAL APPLICABILITY

From the foregoing, it can therefore be seen that encapsulated polymeric articles as disclosed herein may find industrial applicability in many situations such as, but not limited to, situations requiring lightweight, high-strength parts with complex geometrical features. The metallic outer shell may markedly enhance the structural resilience of the article and lead to advantageous improvements in properties such as, but not limited to, stiffness, environmental durability, erosion resistance, impact resistance, and foreign-object damage resistance. In addition, the outer shell may be formed into a range of complex shapes and serve as a template for molding the polymeric substrate. In some circumstances, this fabrication method may lead to increased ease of fabricating complex part geometries and reductions in manufacturing costs. The technology as disclosed herein may find wide industrial applicability in a wide range of areas such as, but not limited to, automotive and aerospace industries.

What is claimed is:

1. A method for fabricating an encapsulated polymeric article, comprising:
   providing a mandrel in a shape of the encapsulated polymeric article;
   shaping an outer shell on the mandrel wherein the outer shell is formed from nickel, cobalt, copper, or an alloy containing at least 50 wt % of the foregoing elements;
   removing the mandrel from the outer shell; and
   molding a polymeric substrate into the outer shell through a port formed in the outer shell to provide the encapsulated polymeric article, wherein molding the polymeric substrate occurs after removing the mandrel and the encapsulated polymeric article is solid; and wherein the port is later introduced into the outer shell after shaping of the outer shell; and
   further comprising removing the port, by a process, from the outer shell after molding the polymeric substrate into the outer shell; and
   attaching at least one additional feature to the encapsulated polymeric article via at least one transient liquid phase bond.

2. The method of claim 1, wherein shaping the outer shell on the mandrel comprises shaping the outer shell on the mandrel by a method selected from the group consisting of electroforming, cold spraying, and plasma vapor deposition.

3. The method of claim 1, wherein molding the polymeric substrate into the outer shell comprises injecting a polymeric material into the outer shell.

4. The method of claim 1, wherein molding the polymeric substrate into the outer shell comprises molding the polymeric substrate by compression molding.

5. The method of claim 1, wherein the polymeric substrate comprises a thermoplastic selected from the group consisting of polyetherimide, polyimide, polyether ether ketone, polyether ketone, polysulfone, polyamide, polyphenylene sulfide, polyesters and combinations thereof or a thermoset selected from the group consisting of condensation polyimides, addition polyimides, epoxy cured with aliphatic amine, aromatic amine, anhydride or a combination of the foregoing, cyanate esters, phenolics, polyesters, polybenzoxazine, polyurethanes, polyacrylates, polymethacrylates, silicones, and combinations thereof.

6. The method of claim 1, wherein the outer shell is formed from cobalt, copper, or an alloy comprising at least 50 wt. % of cobalt, copper, or a combination thereof.

* * * * *